US009121200B2

(12) United States Patent
Weathersby

(10) Patent No.: US 9,121,200 B2
(45) Date of Patent: Sep. 1, 2015

(54) LOCKABLE LOCKSET OPERABLE BY EITHER AXIAL OR ROTATIONAL KNOB MOVEMENT

(71) Applicant: HAMPTON PRODUCTS INTERNATIONAL CORPORATION, Foothill Ranch, CA (US)

(72) Inventor: Steven T. Weathersby, Lake Forest, CA (US)

(73) Assignee: HAMPTON PRODUCTS INTERNATIONAL CORPORATION, Foothill Ranch, CA (US)

( * ) Notice: Subject to any disclaimer, the term of this patent is extended or adjusted under 35 U.S.C. 154(b) by 83 days.

(21) Appl. No.: 13/909,433

(22) Filed: Jun. 4, 2013

(65) Prior Publication Data

US 2014/0047875 A1 Feb. 20, 2014

Related U.S. Application Data

(60) Provisional application No. 61/683,573, filed on Aug. 15, 2012.

(51) Int. Cl.

| | |
|---|---|
| ***B60R 25/02*** | (2013.01) |
| ***E05B 63/16*** | (2006.01) |
| ***E05B 65/06*** | (2006.01) |

(Continued)

(52) U.S. Cl.

CPC ............... *E05B 63/16* (2013.01); *E05B 13/108* (2013.01); *E05B 55/005* (2013.01); *E05B 65/06* (2013.01); *E05C 1/14* (2013.01); *E05B 1/0038* (2013.01);

(Continued)

(58) Field of Classification Search

CPC ....... E05C 1/14; E05B 13/108; E05B 55/005; E05B 2047/69; E05B 1/0038; Y10T 70/5372

USPC .................. 70/221–224, 144–145, 149–159, 70/467–489

See application file for complete search history.

(56) References Cited

U.S. PATENT DOCUMENTS

| | | | |
|---|---|---|---|
| 2,267,939 | A | 12/1941 | McKenzie |
| 2,688,181 | A | 9/1954 | Livermont et al. |

(Continued)

FOREIGN PATENT DOCUMENTS

| | | | |
|---|---|---|---|
| CN | 201210263298.6 | | 7/2012 |
| CN | 202755736 | U | 2/2013 |
| CN | 203308188 | U | 11/2013 |

*Primary Examiner* — Suzanne Barrett

*Assistant Examiner* — Morgan McClure

(74) *Attorney, Agent, or Firm* — Klein, O'Neill & Singh, LLP

(57) ABSTRACT

A lockset has an actuator unit, a mounting unit and a latch retractor mechanism. The mounting unit attaches the lockset to a door and supports the actuator unit and latch retractor mechanism. The actuator unit includes inside and outside door knobs and a cam mechanism that move together within the mounting unit. During rotational movement, a first cam of the cam mechanism engages the latch retractor mechanism to retract the latch. The actuator is axially movable along an axis of the actuator unit when one of the knobs is pushed or pulled. During axial movement, a second cam of the cam mechanism engages the latch retractor mechanism to retract the latch. A locking mechanism is selectively actuable to act between the actuator unit and the mounting unit to prevent both rotational and axial movement of the actuator unit relative to the mounting unit, thereby locking the lockset.

18 Claims, 12 Drawing Sheets

(51) Int. Cl.
*E05B 55/00* (2006.01)
*E05C 1/14* (2006.01)
*E05B 13/10* (2006.01)
*E05B 47/00* (2006.01)
*E05B 1/00* (2006.01)

(52) U.S. Cl.
CPC ...... *E05B 2047/0069* (2013.01); *Y10T 70/5372* (2015.04)

(56) References Cited

U.S. PATENT DOCUMENTS

| | | | | | |
|---|---|---|---|---|---|
| 2,801,536 | A | * | 8/1957 | Walter | 70/468 |
| 2,862,379 | A | * | 12/1958 | Schafer | 70/149 |
| 2,895,322 | A | * | 7/1959 | Pollock | 70/153 |
| 3,035,432 | A | * | 5/1962 | De Vines | 70/216 |
| 3,065,014 | A | | 11/1962 | Russell | |
| 3,128,115 | A | * | 4/1964 | Patriquin et al. | 292/336.3 |
| 3,161,036 | A | * | 12/1964 | Himes et al. | 70/150 |
| 3,490,803 | A | * | 1/1970 | Rollins | 292/170 |
| 3,518,854 | A | * | 7/1970 | Krantz | 70/149 |
| 3,582,121 | A | * | 6/1971 | Rollins | 292/170 |
| 3,877,263 | A | * | 4/1975 | Strickler et al. | 70/149 |
| 4,290,282 | A | * | 9/1981 | Wildenradt | 70/129 |
| 4,671,089 | A | | 6/1987 | Fleming et al. | |
| 5,157,953 | A | * | 10/1992 | Hung | 70/224 |
| 5,301,526 | A | * | 4/1994 | Fann et al. | 70/224 |
| 5,364,139 | A | | 11/1994 | Bergen et al. | |
| 5,469,725 | A | * | 11/1995 | Yamada | 70/208 |
| 5,481,890 | A | | 1/1996 | Millman | |
| 5,727,406 | A | | 3/1998 | Banducci | |
| 5,761,936 | A | | 6/1998 | Kayayama | |
| 5,921,117 | A | * | 7/1999 | Illguth | 70/159 |
| 5,947,535 | A | * | 9/1999 | Baker | 292/165 |
| 6,141,998 | A | | 11/2000 | Seo | |
| 6,360,569 | B1 | * | 3/2002 | Huang | 70/215 |
| 6,386,602 | B1 | | 5/2002 | Lan | |
| 6,868,705 | B2 | * | 3/2005 | Miao | 70/492 |
| 6,997,024 | B2 | * | 2/2006 | Etlicher | 70/210 |
| 7,100,406 | B2 | * | 9/2006 | Masseth, Jr. | 70/210 |
| 7,100,407 | B2 | | 9/2006 | Chen | |
| 7,712,343 | B2 | * | 5/2010 | Smith et al. | 70/467 |
| 8,449,003 | B2 | | 5/2013 | Bunker, II et al. | |
| 8,505,345 | B2 | | 8/2013 | Sun et al. | |
| 8,690,205 | B2 | * | 4/2014 | Benitez et al. | 292/347 |
| 8,813,530 | B2 | * | 8/2014 | Chiou et al. | 70/224 |
| 2002/0104345 | A1 | * | 8/2002 | Wang | 70/472 |
| 2003/0037582 | A1 | * | 2/2003 | Edwards et al. | 70/495 |
| 2005/0126236 | A1 | * | 6/2005 | Romero | 70/224 |
| 2006/0185409 | A1 | * | 8/2006 | Sun et al. | 70/224 |
| 2008/0168809 | A1 | * | 7/2008 | Liu et al. | 70/224 |
| 2009/0078011 | A1 | * | 3/2009 | Avni | 70/486 |
| 2009/0288459 | A1 | * | 11/2009 | Liu et al. | 70/224 |
| 2011/0289987 | A1 | * | 12/2011 | Chiou et al. | 70/91 |

* cited by examiner

LOCKABLE LOCKSET OPERABLE BY EITHER AXIAL OR ROTATIONAL KNOB MOVEMENT

CROSS-REFERENCE TO RELATED APPLICATION

This application claims priority, under 35 U.S.C. §119(e), from U.S. Provisional Application No. 61/683,573, filed Aug. 15, 2012, the disclosure of which is incorporated herein by reference in its entirety.

FEDERALLY SPONSORED RESEARCH OR DEVELOPMENT

Not Applicable.

BACKGROUND

The present disclosure relates to the field of locksets for doors. More specifically, it relates to locksets having a latch bolt that is actuated by axial or rotational movement of a door knob.

Non-lockable door locksets that have a knob-actuated latch bolt in which the latch bolt may be actuated either by an axial ("push-pull") movement of the knob on either side of the lockset, or by rotational movement of the knobs on either side of the lockset, are well-known. Typically, these locksets are operated by pushing the outside knob, pulling the inside knob, or rotating either knob in either direction to retract the latch bolt. Lockable locksets with knob-actuated latch bolts that may be actuated by rotational movement of the knobs are ubiquitous. The locking function, however, introduces complexities in locksets, which complexities have not previously been adequately resolved for locksets that are actuable by axial movement of the knobs.

There is a need for a practical lockset that is operable in a push-pull mode, or both a push-pull mode and a rotational mode, and that is also selectively lockable from one or both sides. Such a lockset preferably can be easily installable in standard doors (i.e., doors of standard thickness), and preferably is relatively simple and inexpensive to manufacture, of durable construction, and reliable in operation.

SUMMARY

The present disclosure relates to a lockable lockset having a knob-actuated latch bolt that may be actuated either by axial ("push-pull") movement or by rotational movement of the knobs on either side of the lockset. The lockset combines elements of a modified cylindrical lockset with modified locking components more often used in tubular keyed entry locksets to make a lockset in which the latch bolt may be retracted by either axial "push-pull" movement of the knobs or bi-directional rotation movement of either the outside or inside knob, and in which the knobs can be locked against both axial and rotational movement for retracting the latch bolt through the use of a locking bar-actuated locking plates that engage the tubular structure of the lockset. The locking may be effected by a keyed cylinder or by a turnpiece accessible on the inside knob of the door, or, in another configuration, by a non-keyed cylinder that can be operated rotationally by a flat object on the outside knob, and by the turnpiece noted in the previous configuration on the inside knob. The former configuration is typical of a lockset that is lockable from the outside of the door, and the latter is typical of a lockset having a privacy lock on the inside of the door.

Broadly, the exemplary embodiments disclosed herein relate to a lockable lockset, comprising an actuator unit comprising an inside knob, an outside knob, and a cam mechanism operatively coupled to the inside knob and the outside knob, the actuator unit configured to move as a unit; a latch retractor mechanism having a latch bolt that is movable between an extended and a retracted position; a mounting unit configured to attach to a door, the mounting unit supporting the actuator unit and the latch retractor mechanism so that the actuator unit and at least portions of the latch retractor mechanism can move relative to the mounting unit and each other, the actuator unit being movable rotationally about an axis of the actuator unit and axially along the axis of the actuator unit; the actuator unit having a first cam configured to engage the latch retractor mechanism during rotational movement of the actuator unit so as to move the latch bolt from the extended position to the retracted position; the actuator unit having a second cam configured to engage the latch retractor mechanism during axial movement of the actuator unit so as to move the latch bolt from the extended position to the retracted position; and a locking mechanism configured to selectively extend between the actuator unit and the mounting unit so that when the locking mechanism is extended, the actuator unit is prevented from moving both rotationally and axially relative to the mounting unit.

DETAILED DESCRIPTION

Figure 1B:
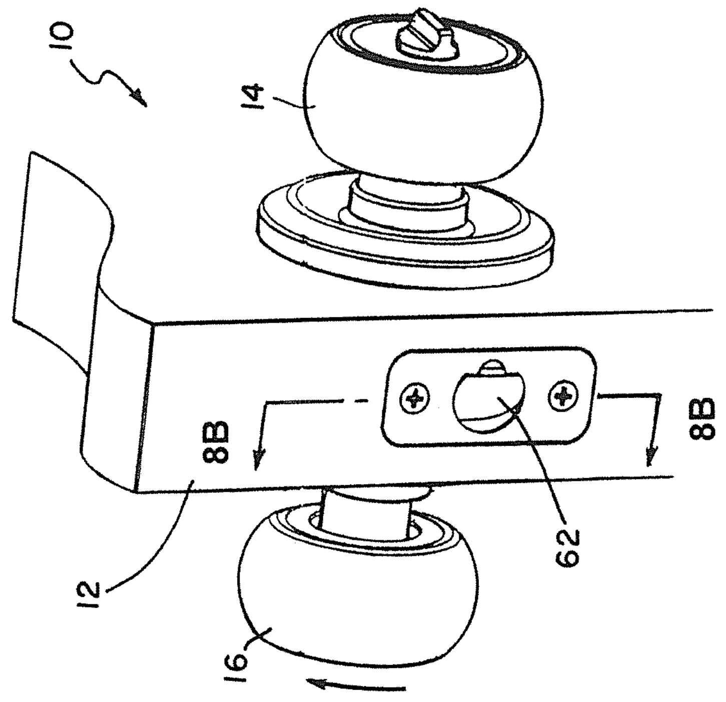
FIG. 1B shows the assembly of FIG. 1A in a configuration in which a latch bolt of the lockset has been retracted by rotation of a door knob of the lockset.
Figure 1A:
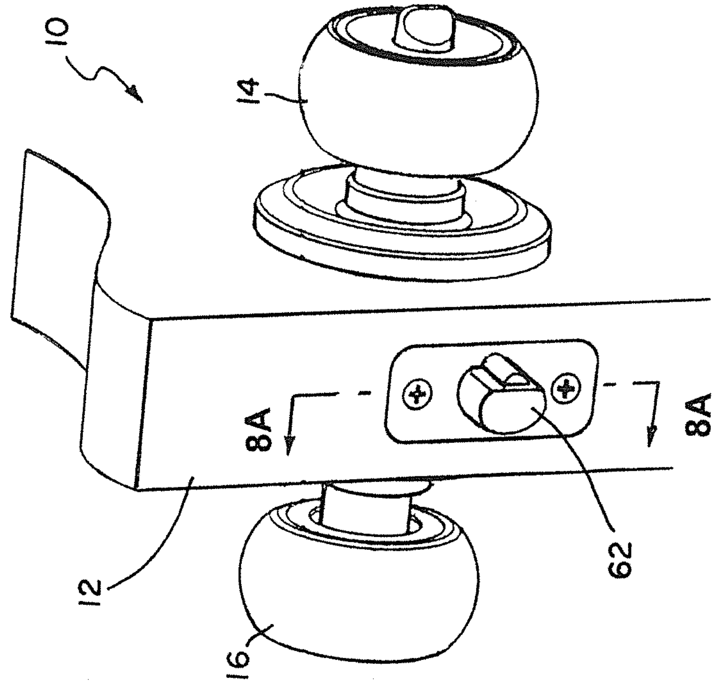
FIG. 1A shows a perspective view of a lockset in accordance with the present disclosure installed in a door.
Figure 1C:
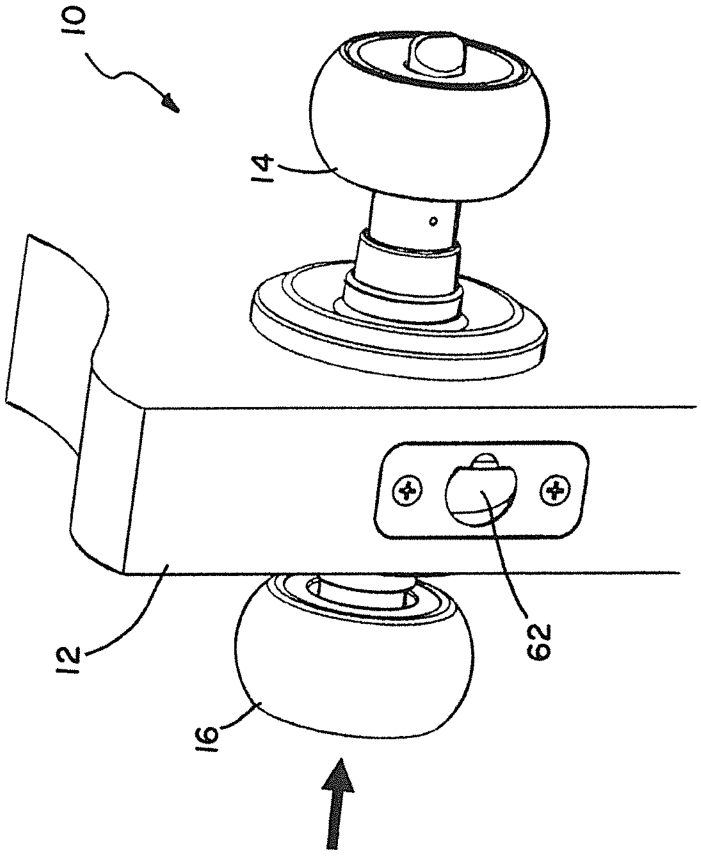
FIG. 1C shows the assembly of FIG. 1A in a configuration in which a latch bolt of the lockset has been retracted by axial translation of door knobs of the lockset.

FIG. 1A shows a perspective view of a lockset 10, in accordance with a preferred embodiment of the present disclosure, installed on a door 12. The lockset 10 has an inside knob 14 and an outside knob 16. As shown in FIG. 1B, the outside knob 16 is shown as being rotatable to retract a latch bolt 62. Likewise, the inside knob 14 is similarly rotatable to retract the latch bolt 62. With additional reference to FIG. 1C, knobs 14, 16 are shown as being axially translatable to retract the latch bolt 62. More specifically, as outside knob 16 is pushed and axially translated as shown in FIG. 1C, the latch bolt 62 is retracted. Pulling on the inside knob 14 will have the same effect. As such, in the illustrated embodiment the latch bolt 62 is retractable by rotating either of the knobs 14, 16 either clockwise or counterclockwise, or by moving the knobs axially by either pushing the outside knob 16 or pulling the inside knob 14. As will be discussed in more detail below, embodiments of the illustrated lockset 10 may be locked against pushing, pulling or rotational operation when the latch bolt is in its extended position, whereby the door 12 is locked shut.

Figure 2:
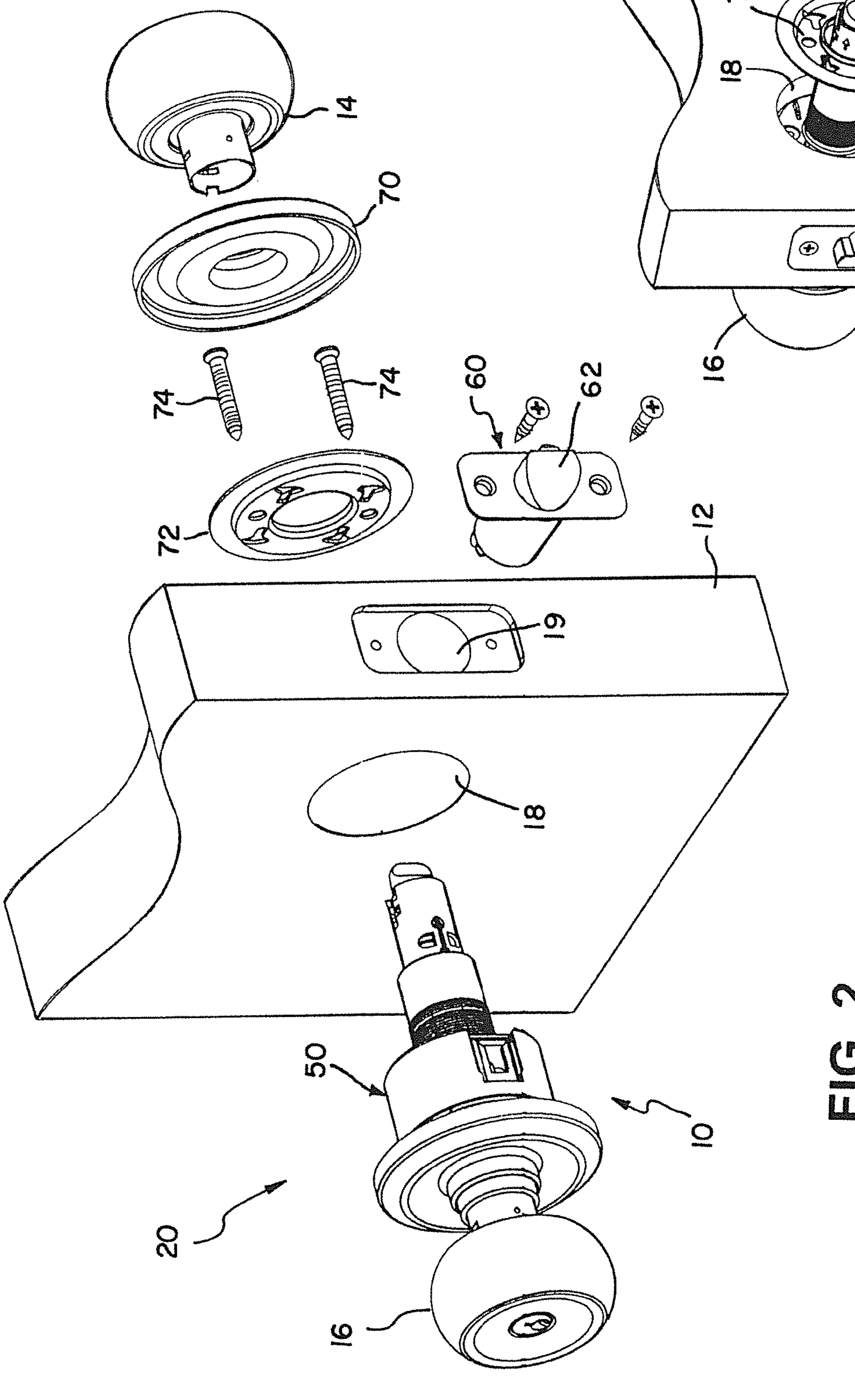
FIG. 2 shows a partially exploded perspective view of the assembly of FIG. 1A.
Figure 3:
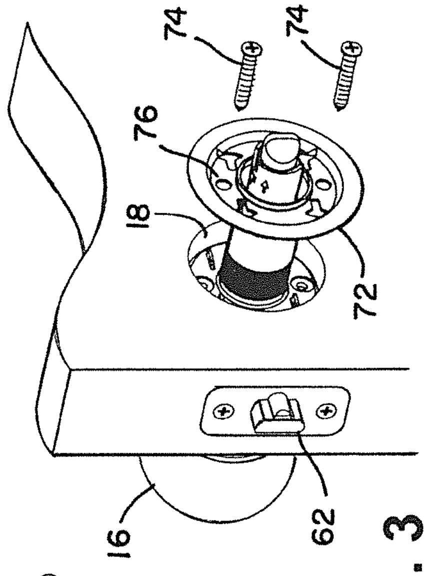
FIG. 3 shows another view of part of the assembly of FIG. 2.
Figure 4:
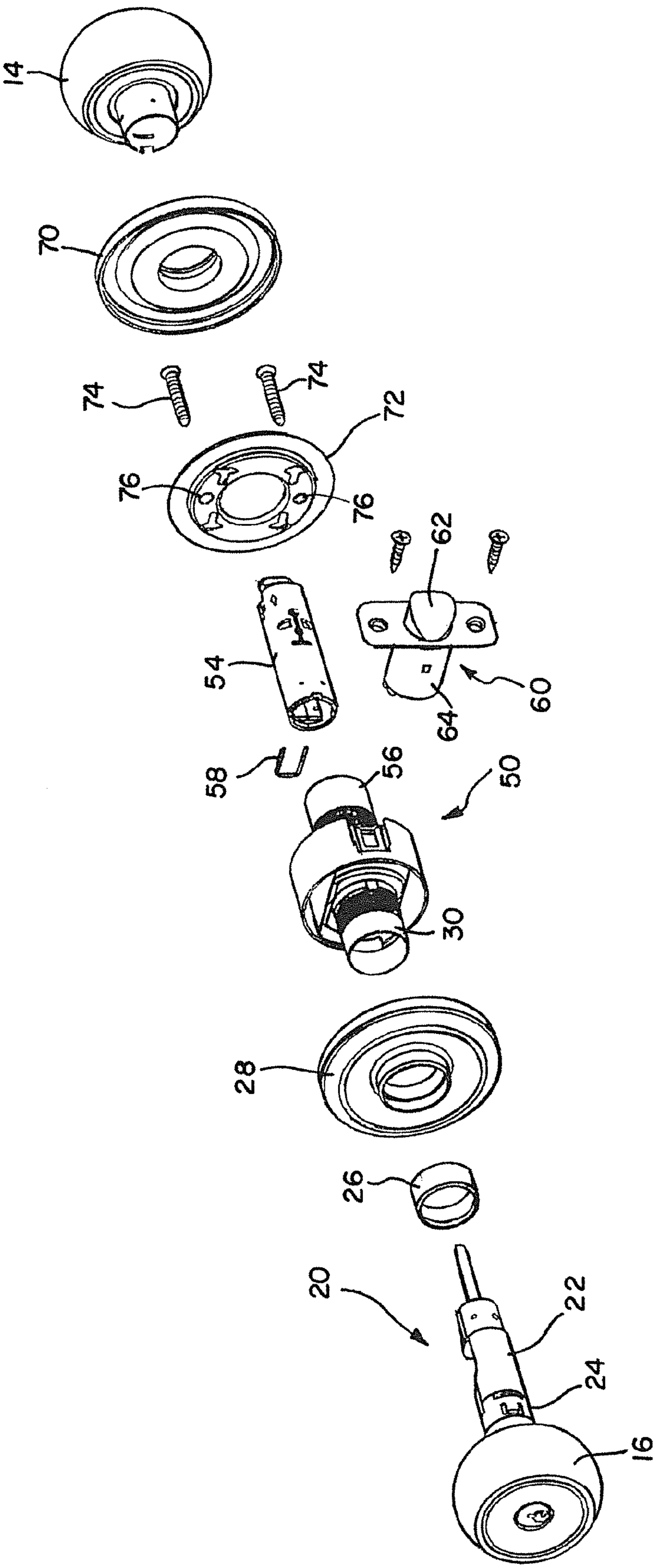
FIG. 4 shows an exploded perspective view of a lockset in accordance with an embodiment of the present disclosure.

With reference next to FIGS. 2, 3, and 4, the lockset 10 preferably comprises an outside knob assembly 20 that fits through a door mount hole 18 so that a latch bolt retractor housing assembly 50 sits within the hole 18. A mounting plate 72 can be used to secure the outside knob assembly 20 in place. In the illustrated embodiment, screws 74 extend through holes 76 in the mounting plate 72 (see FIG. 4) and attach to threaded holes 172 (see FIG. 7) in the latch bolt retractor housing assembly 50 so as to hold the outside knob assembly 20 in place. An inside cover plate 70, or "rose", is threaded onto a portion of the latch bolt retractor housing assembly 50, and the inside knob 14 is attached to the outside knob assembly 20. A latch bolt assembly 60 having the latch bolt 62 fits through a latch bolt passage 19 in the door 12 so that the latch bolt assembly 60 can connect to the latch bolt retractor housing assembly 50.

There are several styles and designs for locksets, and it is anticipated that other types of structures can be employed, For example, in some embodiments, the inside cover plate 70 may be connected to the mounting plate 72 by, for example, an interference fit between the circumference of the mounting plate 72 and a mating inside surface of the cover plate 70. In other embodiments a leaf spring may be dimensioned and located to exert a force to the inside diameter of the cover plate 70 to retain it in place. In further embodiments the mounting plate 72 and inside cover 70 may be formed as a single, unitary component, and can be held in place by fasteners such as screws or bolts that may pass through clearance holes in the cover plate and through holes in the mounting plate, and attach to threaded holes in the latch bolt retractor housing assembly.

FIG. 4 shows an exploded perspective view of a lockset 10 and its major components. The outside knob assembly 20 includes the outside door knob 16 fixed to a first end of a cam element 22 by a tubular outside knob spindle 24. The cam element 22 is advantageously inserted through an outside finishing ring 26 and an outside cover plate 28, or rose, for mounting the outside knob assembly 20 on the outside of the door 12, as is well-known in the art. The outside cover plate 28 is threaded onto a first externally-threaded tubular hub 30 on a first end of the latch bolt retractor housing assembly 50 (described in detail below), so that the cam element 22 extends through the latch bolt retractor housing assembly 50.

With continued reference to FIG. 4, a first end of an inside spindle 54 is received in a second externally-threaded tubular hub 56 on a second end of the latch bolt retractor housing assembly 50, and can be attached to the second end of the cam element 22 by a spindle clip 58 and tabs (not shown) on the inside spindle 54, which tabs may be bent inward so as to engage the cam element 22. The inside spindle 54 has a second end to which the inside door knob 14 is fixed. The inside door knob can have a turnpiece 59 (see FIGS. 9 and 10) for actuating a locking mechanism. The latch bolt retractor housing assembly 50 is attached to the latch bolt assembly 60, including the latch bolt 62 and a latch bolt cylinder 64, in a manner to be described below.

Figure 5:
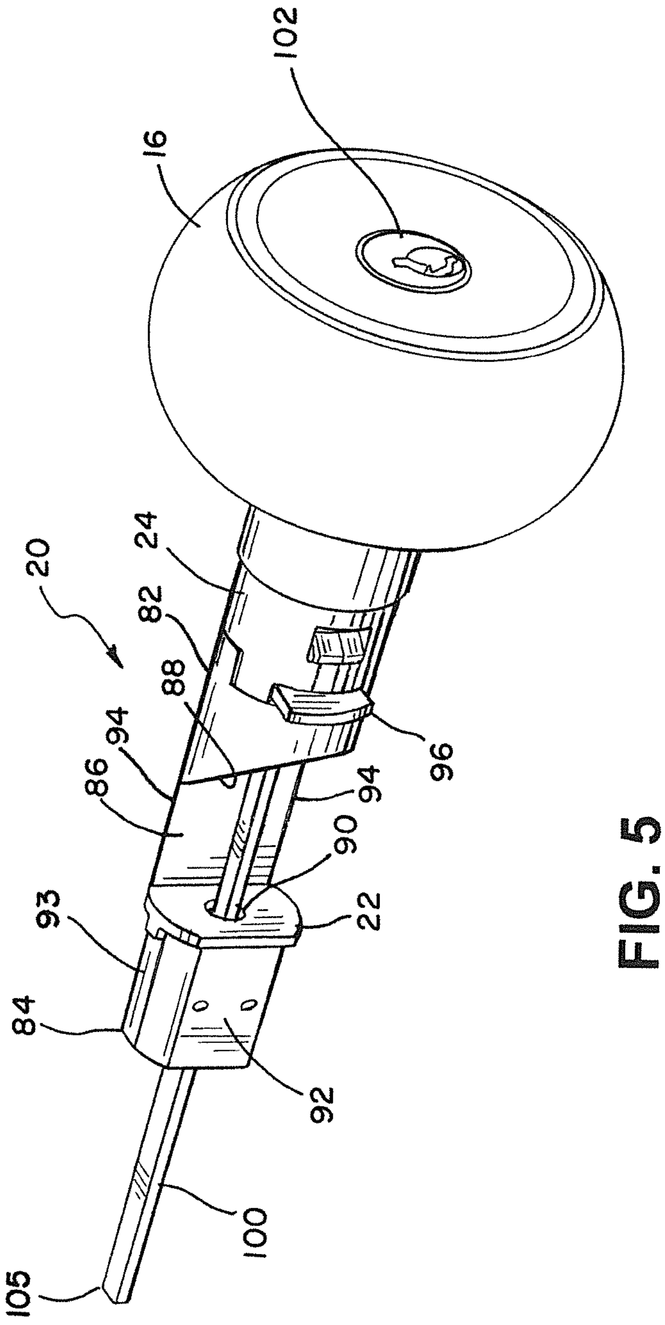
FIG. 5 shows a perspective view of an outside knob assembly of the lockset of FIG. 4.
Figure 6:
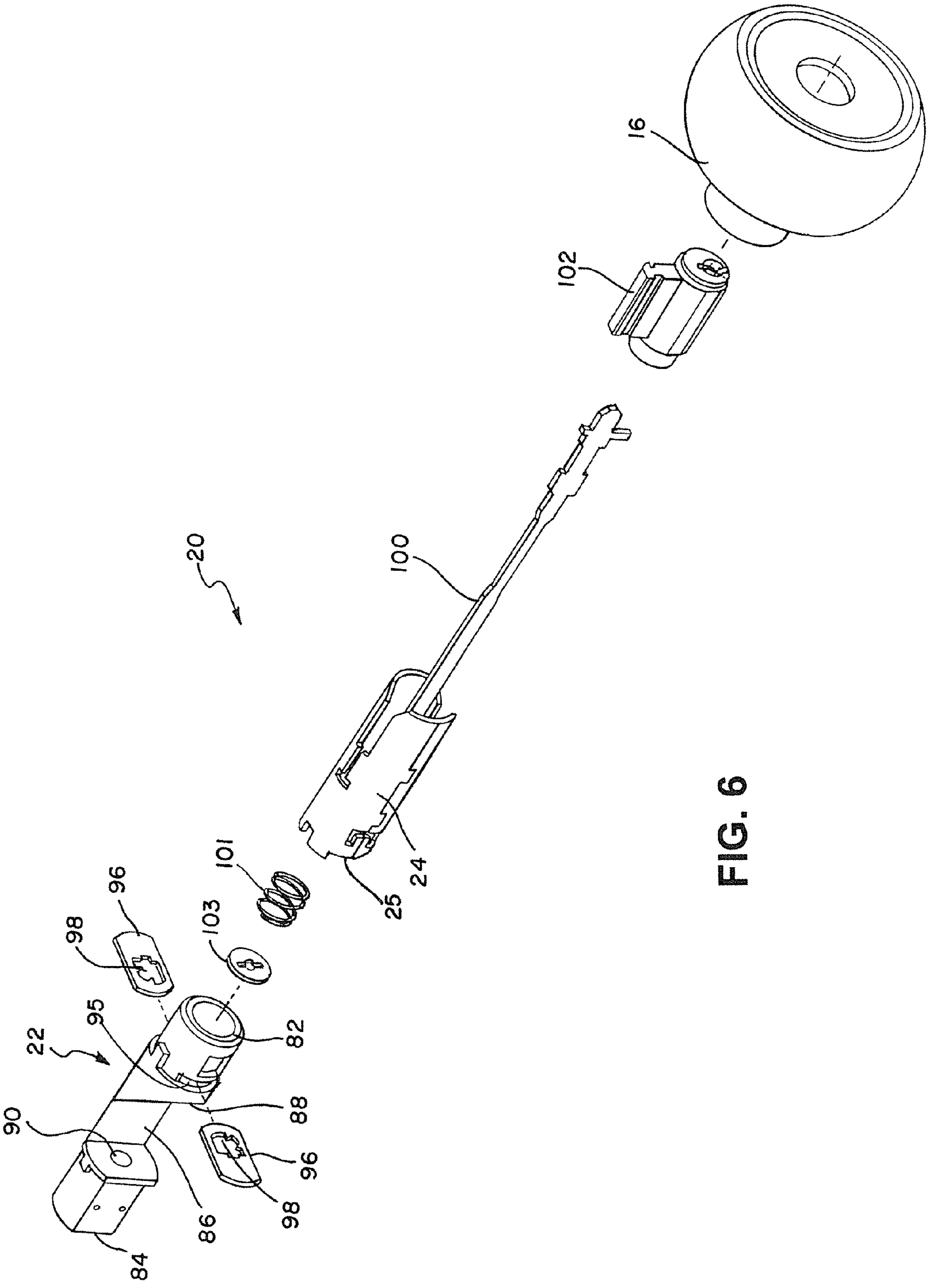
FIG. 6 shows an exploded perspective view of the outside knob assembly of FIG. 5.

With reference next to FIGS. 5 and 6, in the illustrated embodiment, the outside knob assembly 20 includes the outside knob 16, the cam element 22, and the outside knob spindle 24. The outside knob 16 is secured to a tubular first fitting 82 (FIG. 6) at a first or outer end of the cam element 22 by the tubular outside knob spindle 24. The cam element 22 also includes a second fitting 84 at a second or inner end of the cam element 22, the second fitting 84 being connected to the first fitting 82 by an arcuate connecting segment 86 defining a flat open area between the first fitting 82 and the second fitting 84. The first fitting 82 provides a first cam defined by an inclined camming surface 88 connecting the first fitting 82 to the connecting segment 86 and facing the open area. The arcuate connecting segment 86 provides a second cam defined by opposed longitudinal camming edges 94 defining opposed sides of the flat open area. The second fitting 84 includes an axial through-bore 90, and preferably is partially cylindrical, with a substantially flat axial surface 92 and an arcuate outer surface 93.

With continued reference to FIGS. 5 and 6, the first fitting 82 includes a diametric channel 95 that is dimensioned and located to receive a pair of locking plates 96 installed in the first fitting 82. In the illustrated embodiment, the locking plates 96 are elongate and flat, and have a thickness and width. Opposing ends of the elongate locking plates 96 preferably are arcuate, preferably having a curvature that generally follows the curvature of the outer surfaces of the outside knob spindle 24 and the cam element 22.

The channel 95 is elongated in a circumferential direction generally corresponding to the width of the locking plates 96. In a preferred embodiment, the channel 95 has a width along the longitudinal axis of the cam element 22 generally corresponding to double the width of each locking plate 96 so that the channel 95 can slidably complementarily accommodate both locking plates 96 therein. In other embodiments, the channel 95 may be configured to complementarily accommodate only a single one of the locking plates 96.

In the illustrated embodiment, the outside knob spindle 24 fits onto and engages the first fitting 82 of the cam element 22. Cutouts 25 in the outside knob spindle 24 are dimensioned and located to align with the channel 95 so as to also complementarily accommodate the locking plates 96 and enable unrestricted lateral movement of the locking plates 96.

Continuing with reference to FIG. 6, each of the illustrated locking plates 96 has an aperture 98 configured to receive a rotatable tailpiece or locking bar 100 extending therethrough. Preferably the locking bar 100 also extends through the tubular outside knob spindle 24, through the tubular first fitting 82, across the open area of the connecting element 86 and through the bore 90 of the second fitting 84. Each of the apertures 98 is configured with a camming edge, so that during axial rotation of the locking bar 100, the locking bar engages the camming edges of the apertures 98 so as to move the locking plates 96 radially in diametrically opposite directions through the channel 95 between a withdrawn first (unlocked) position and an extended second (locked) position. In the first (unlocked) position, the locking plates 96 are radially retracted within the channel 95. In the second (locked) position, the locking plates 96 are radially deployed so as to extend outwardly from the channel 95 and radially outwardly from a surface of the cam element 22 and/or spindle 24, as depicted in FIG. 5 and described more fully below.

In the illustrated embodiment the outside knob 16 includes a keyed lock cylinder 102, preferably of conventional design, that is operatively connected to a first end of the rotatable locking bar 100. The locking bar 100 extends through the entire length of the cam element 22, passing through the outside knob spindle 24, the first fitting 82, the open space defined by the connecting segment 86, and the axial bore 90 of the second fitting 84, terminating in a second or inner end 105 that is connected to the turnpiece 59 of the inside knob 14 (see FIGS. 9 and 10). The locking bar 100 preferably is flattened, and, as will be discussed below, is rotatable between a first position and second position to move the pair of locking plates 96 radially in and out of the channel 95 so as to allow the lockset to be selectively locked against operation of the latch bolt by axial or rotational movement. A locking bar guide plate 103 may advantageously be rotatably installed in the first fitting 82 to maintain the locking bar 100 in proper operational alignment and engagement with the locking plates 96. A spring 101 may also be provided in the first cam element fitting 82 to engage the locking plates 96 with an axially-applied force so as to maintain them in operational alignment with the channel 95.

Figure 7:
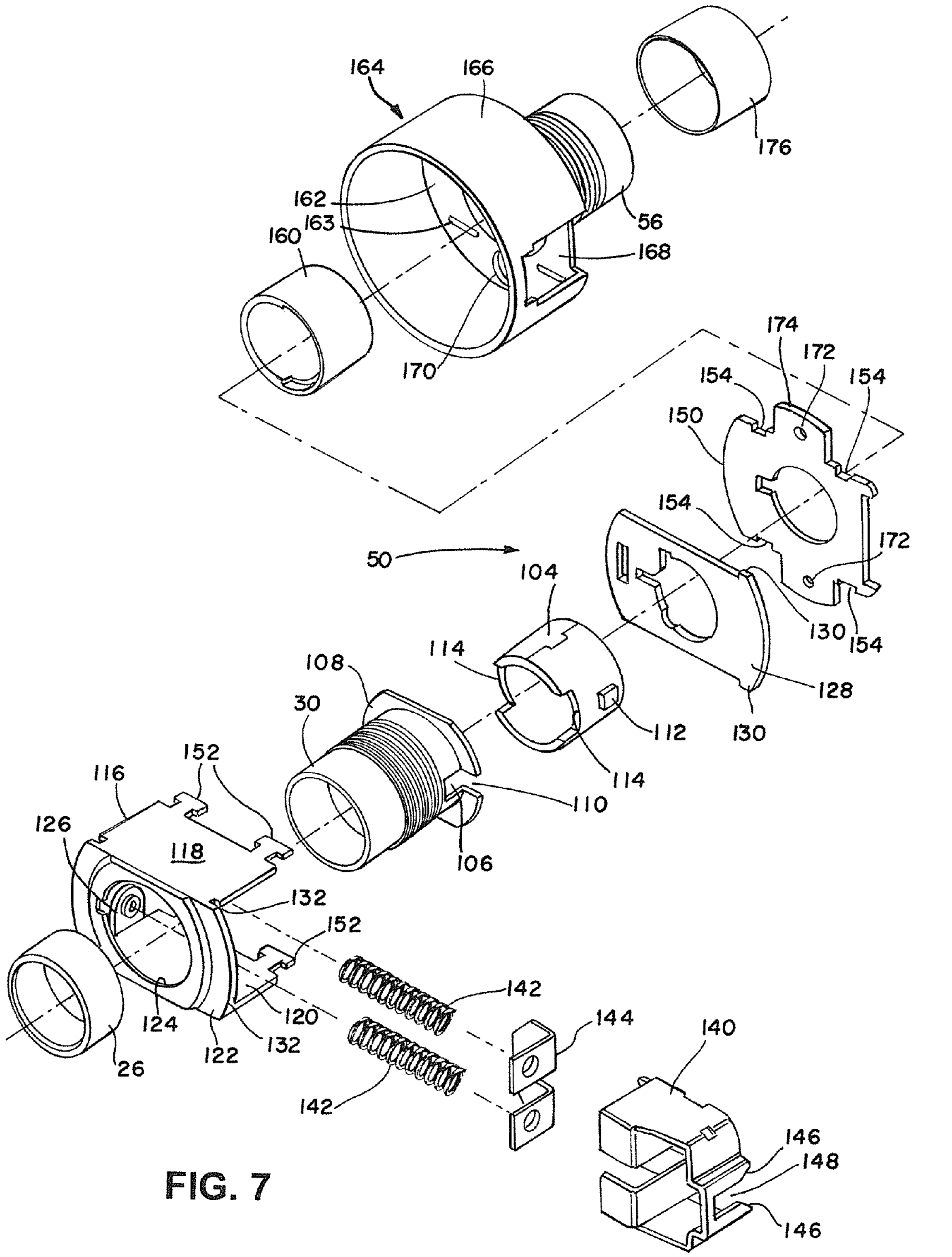
FIG. 7 shows an exploded perspective view of a latch bolt retractor assembly employed in the lockset embodiment of FIG. 4.

Referring next to FIG. 7, the illustrated latch bolt retractor housing assembly 50 includes the first externally-threaded tubular hub 30 having an open first end that receives a locking sleeve 104 within it. The first open end of the first tubular hub 30 has a pair of diametrically-opposed axial slots 106 (only one of which is shown), and it is provided with an end flange 108 having a pair of diametrically-opposed radial slots 110 (only one of which is shown), each of which is contiguous with one of the axial slots 106. Each pair of slots 106, 110 receives one of a diametrically-opposed pair of anti-rotation nubs 112 (only one which is shown) on the locking sleeve 104. The engagement of the nubs 112 in the slots 106, 110 maintains the locking sleeve 104 in a desired alignment relative to the latch bolt retractor housing assembly 50 and prevents the locking sleeve 104 from rotating relative to the latch bolt retractor housing assembly 50.

The locking sleeve 104 has a front face with a pair of diametrically-opposed cut-outs 114 communicating with the channel 95. Each of the cut-outs 114 is sized to accommodate one of the pair of locking plates 96 when it is moved radially outward from the channel 95 to its locked position as described above. Each cutout 114 is defined by opposing edge surfaces and an axial stop surface extending between the edge surfaces. Preferably a width between the edge surfaces of each cutout 114 is complementary to a width of the corresponding locking plate 96 so that the locking plate 96 can be received into the cutout with only small clearances between the edges of the plate and the edge surfaces of the cutout 114. In other embodiments, the cutouts 114 can comprise apertures formed through the locking sleeve 104 so that each cutout 114 circumferentially surrounds the portion of a locking plate 96 that is extended into the cutout 114, with opposing axial stop surfaces that are spaced apart a distance complementary to a thickness of the locking plate.

Continuing with reference to FIG. 7, a latch bolt retractor housing 116 comprises a top wall 118 and a bottom wall 120 joined by a vertical wall 122 defining an opening 124. A pair of spring seats 126 (only one of which is shown) extend upwardly from the bottom wall 120 and downwardly from the top wall 118. The first tubular hub 30 is passed through the opening 124 in the vertical wall 122 until the end flange 108 of the first tubular hub 30 abuts against the vertical wall 122. A fixation plate 128 fits into the inside of the latch bolt retractor housing 116 until it abuts against the flange 108 of the first tubular hub 30 to fix the first tubular hub 30 in the latch bolt retractor housing 116. The fixation plate 128 may be secured to the latch bolt retractor housing 116 by tabs 130 that are engaged in a pair of notches 132 in the top wall 118 and bottom wall 120, respectively, of the latch bolt retractor housing 116 near their respective junctures with the vertical wall 122.

The latch bolt retractor housing 116 is configured to accommodate a latch bolt retractor 140. The latch bolt retractor 140 is movable laterally with respect to an axis of the latch bolt retractor housing 116, and it is biased in a radially outward direction by a pair of coil springs 142 having inner ends seated on the spring seats 126 in the latch bolt retractor housing 116. The springs 142 act through a spring plate 144 seated within the latch bolt retractor 140. The latch bolt retractor 140 has an outer wall formed as a pair of parallel rails 146 that define a slot 148 between them. The rails 146 and the slot 148 can be of conventional design, configured for operative engagement, respectively, with a pair of notches 61 (see FIGS. 8A and 8B) of a latch bolt actuator 63 (see FIG. 8B) in the latch bolt assembly 60. Thus, as in conventional locksets of this general type, movement of the retractor 140 radially inward into the latch bolt retractor housing 116 against the force of the springs 142 retracts or withdraws the latch bolt 62 (see FIG. 4) axially through the latch bolt cylinder 64 to a withdrawn or disengaged position, while movement of the retractor 140 outwardly from the latch bolt retractor housing 116 under the force of the springs 142 allows the latch bolt 62 to be extended outwardly from the cylinder 64 to its extended or engaged position. The side of the latch bolt retractor housing 116 opposite the vertical wall 122 is closed by a housing support plate 150, which is attached to the top wall 118 and the bottom wall 120 of the latch bolt retractor housing 116 by means of tabs 152 on the top wall 118 and the bottom wall 120 that engage with notches 154 in the support plate 150.

Continuing with reference to FIG. 7, an inside spindle bushing 160 is seated within the second tubular hub 56 which extends from an apertured wall 162 of a retractor housing cover 164. The retractor housing cover 164 has a cylindrical shroud 166 with a cut-out 168. The cylindrical shroud 166 is dimensioned to fit over the latch bolt retractor housing 116, with the cut-out 168 positioned so that the latch bolt retractor 140 can extend through the cut-out 168 when biased radially outward by the springs 142.

The retractor housing cover 164 is attached to the retractor housing 116 by tabs 152 that pass through slots 163 in the apertured wall 162 of the retractor housing cover 164. The tabs 152 can be bent or twisted to secure the components together. Holes 170 in the apertured wall 162 of the retractor housing cover 164 each align with a threaded hole 172 in each of a pair of diametrically opposed ears 174 of the housing support plate 150. A threaded fastener (not shown) can be extended through the aligned holes to secure the retractor housing cover 164 to the housing support plate 150.

Both the first tubular hub 30 and the second tubular hub 56 have external threads for the installation of the outside mounting plate 28 and the inside cover plate 70, respectively. An inside finishing ring 176 may be provided to fit over the end of the second tubular hub 56 to provide an aesthetically pleasing finish between the second tubular hub 56 and the inside door knob 14. The outside finishing ring 26 may be provided to fit over the end of the first tubular hub 30 to provide an aesthetically pleasing finish between the first tubular hub 30 and the outside door knob 16.

As explained more fully below, the above described arrangement allows the outside knob assembly 20 and the inside spindle 54 (to which is fixed the inside knob 14) to move axially and rotationally as a single unit. Thus, pushing the outside knob 16 or pulling the inside knob 14 causes the cam element 22 and the inside spindle 54 to translate together axially relative to the latch bolt retractor 140, while rotating the outside knob 16 or rotating the inside knob 14 causes the cam element 22 and the inside spindle 54 to rotate together relative to the latch bolt retractor 140. This assembly of the inside and outside knobs 14, 16 and the components that connect the knobs so that they move axially and rotationally as a single unit can be referred to as the knob unit or actuator unit.

Figure 8A:
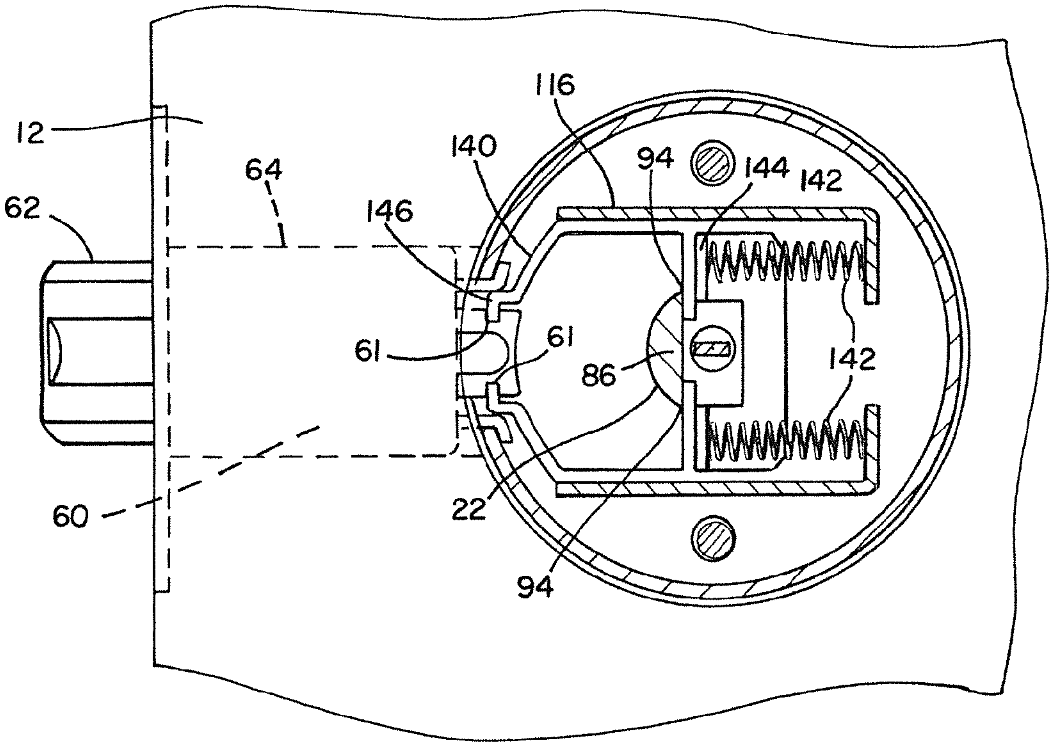
FIG. 8A shows a view taken along lines 8A-8A of FIG. 1A.
Figure 8B:
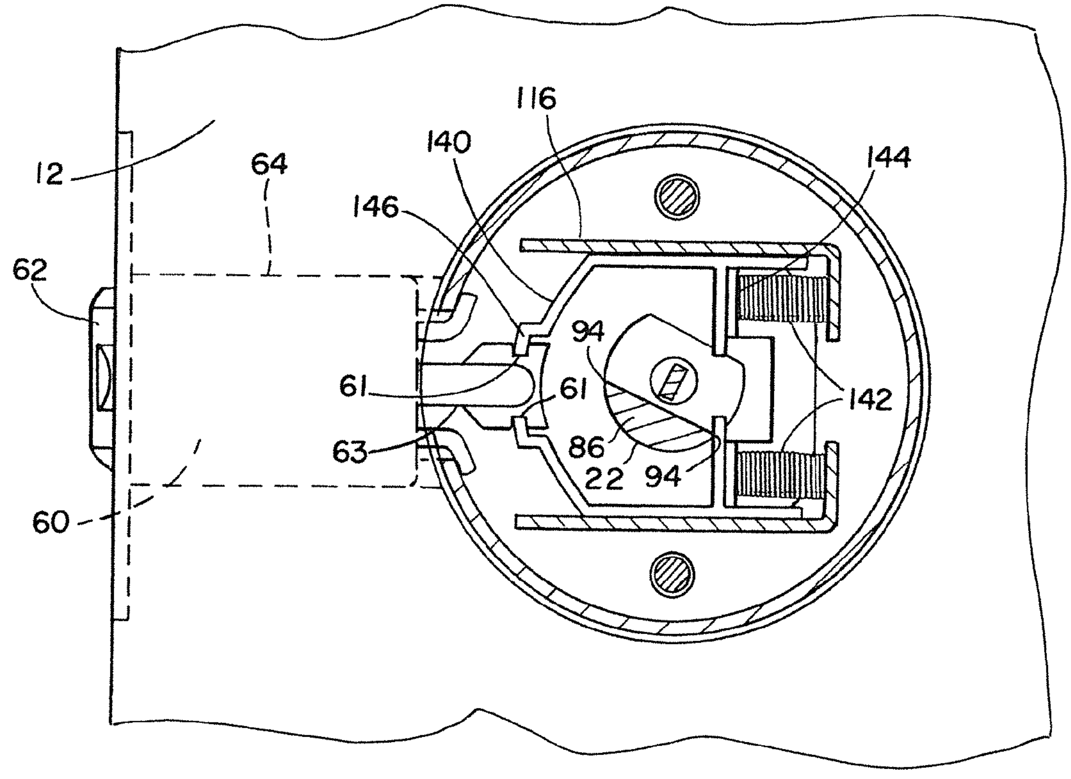
FIG. 8B shows a view taken along lines 8B-8B of FIG. 1B.

With reference next to FIGS. 8A and 8B, front sectional views of the assembly installed in a door 12 show the rotational operation of one embodiment. In FIG. 8A, the latch bolt 62 is in its extended or engaged position. The latch bolt actuator 63 of the latch bolt assembly 60 is engaged in the slot 148 between the rails 146 of the latch bolt retractor 140, with the rails 146 captured in the actuator notches 61, as described above. Within the latch bolt retractor housing 116, the springs 142 are extended, pushing the spring plate 144 against the latch bolt retractor 140, which is engaged with the connecting segment 86 of the cam element 22. Rotation of one of the knobs 14, 16 causes corresponding rotation of the cam element 22 as depicted in FIG. 8B. As the cam element 22 rotates, one of the cam edges 94 of the connecting segment 86 engages the latch bolt retractor 140, compressing the springs 142 and moving the latch bolt retractor 140 transversely away from the edge of the door. Specifically, rotation of the cam element 22 in a first direction brings one of the cam edges 94 to bear against the latch bolt retractor 140, while rotation of the cam element 22 in the opposite direction brings the other of the cam edges 94 to bear against the latch bolt retractor. In either case, the engagement of one of the cam edges 94 against the latch bolt retractor 140 translates both latch bolt retractor 140 and the latch bolt actuator 63 of the latch bolt assembly 60. Because the latch bolt 62 is connected to the latch bolt actuator 63, the latch bolt 62 is thus moved to its withdrawn or disengaged position.

Figure 9:
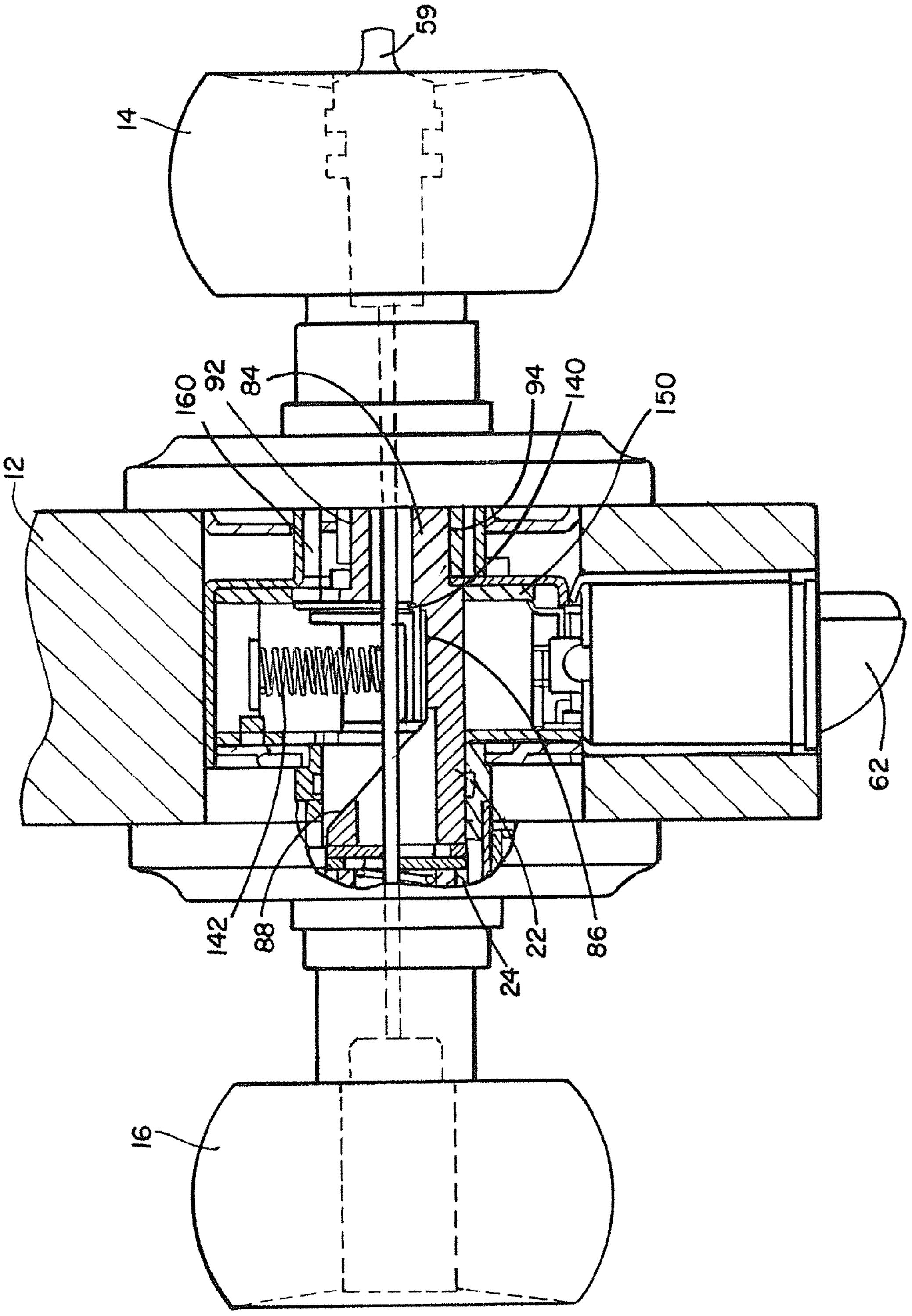
FIG. 9 shows a partially cut away cross sectional view of a preferred embodiment of the present disclosure mounted on a door in functional cooperation with a latch in a first, or neutral, position.
Figure 10:
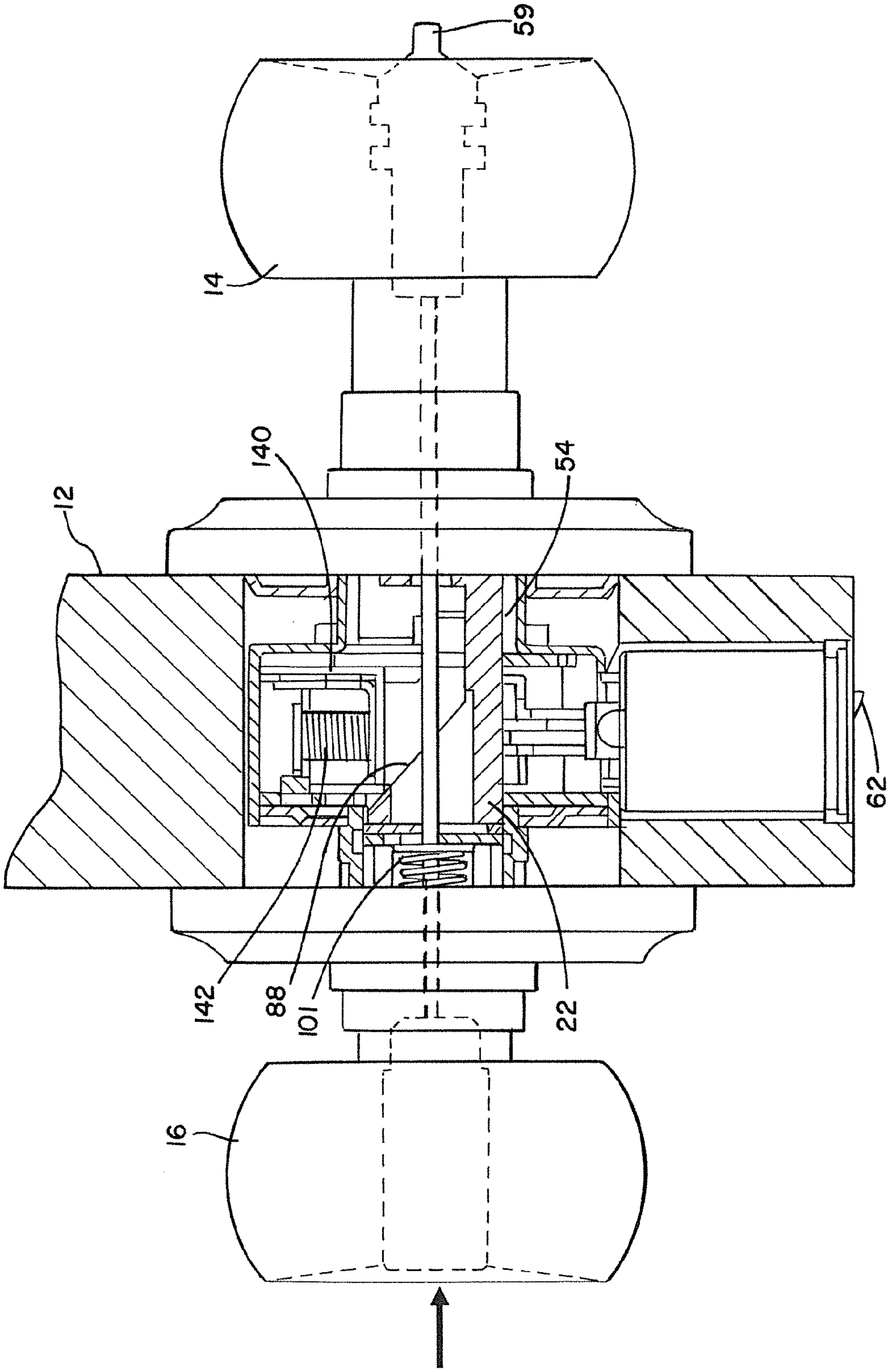
FIG. 10 shows the assembly of FIG. 9 with the latch in a second, or activated, position.

With reference next to FIGS. 9 and 10, transverse top cross-section views of a lockset in accordance with an embodiment of this disclosure installed in a door 12 show translational operation of the lockset. The lockset is unlocked, and in FIG. 9 it is in a "neutral" position, in which it has not been translated or rotated. The inclined cam surface 88 of the cam element 22 is adjacent and/or in contact with the latch bolt retractor 140, but exerts no force against it, as indicated by the springs 142 being uncompressed. As such, the latch bolt retractor 140 is in an extended position relative to the latch bolt retractor housing 116. When the latch bolt retractor 140 is in this extended position, the latch bolt 62, which is engaged by the retractor 140, is likewise in its extended or disengaged position as shown.

With reference next to FIG. 10, when the cam element 22 and the inside spindle 54 are moved axially by either pushing the outside knob 16 or pulling the inside knob 14 (i.e., moving left to right as shown by the arrow), the inclined cam surface 88 of the cam element 22 engages the latch bolt retractor 140, driving the latch bolt retractor 140 radially inward against the bias of the springs 142, thereby urging the latch bolt 62 to its withdrawn or disengaged position. The springs 142 are compressed, so that when the axial force on the knobs 14, 16 is released, the springs 142 drive the latch bolt retractor 140 radially outward to return the latch bolt 62 to its extended position, while at the same time the engagement of the retractor 140 against the inclined cam surface 88 drives the cam element 22 and the inside spindle 54 back to the neutral position shown in FIG. 9.

With reference next to FIGS. 11A, 11B, 12A, and 12B, the locking plates 96 are moveable between a retracted or unlocked position and an extended or locked position. In their extended or locked position, the locking plates 96 prevent the rotation or translation of the lockset by their engagement with the locking sleeve 104. When the extended locking plates 96 are engaged with the locking sleeve 104, the plates 96 extend radially from the channel 95 through the sleeve cut-outs 114. The locking sleeve 104 is attached to the latch bolt housing assembly 50, and thus is immobile relative to the door. As such, edges of the locking plates 96 engage edge surfaces of the locking sleeve cut-outs 114 so as to prevent the cam element 22 and the associated inside spindle 54 and knobs 14, 16 from rotating. Faces of the locking plates 96 engage the axial stop surface of the associated cut-outs 114 so as to prevent the cam element 22 and the associated inside spindle 54 and knobs 14, 16 from moving longitudinally relative to the latch bolt retractor housing assembly 50. As such, when in the extended or locked position, the locking plates 96 engage with the locking sleeve 104 to prevent the knobs 14, 16 and associated spindles both from moving rotationally and from translating axially.

The locking plates 96 are adjacent one another in the illustrated embodiment, and thus the faces of the plates are closely spaced from each other longitudinally. In some embodiments, the cutouts 114 are identical on opposing sides of the locking sleeve 104. As such, when in the extended or locked position, only one of the plates 96 will engage the axial stop surface of its associated cutout 114, while the other plate will be spaced from its associated cutout axial stop surface. In other embodiments, the cutouts 114 on opposing sides of the locking sleeve 104 are positioned so that the axial stop surfaces of the cutouts are longitudinally spaced to correspond with the longitudinal spacing of the locking plate faces. As such, when in the extended or locked position, each of the locking plates 96 will engage the associated cutout axial stop surface.

Figures 11A, 11B:
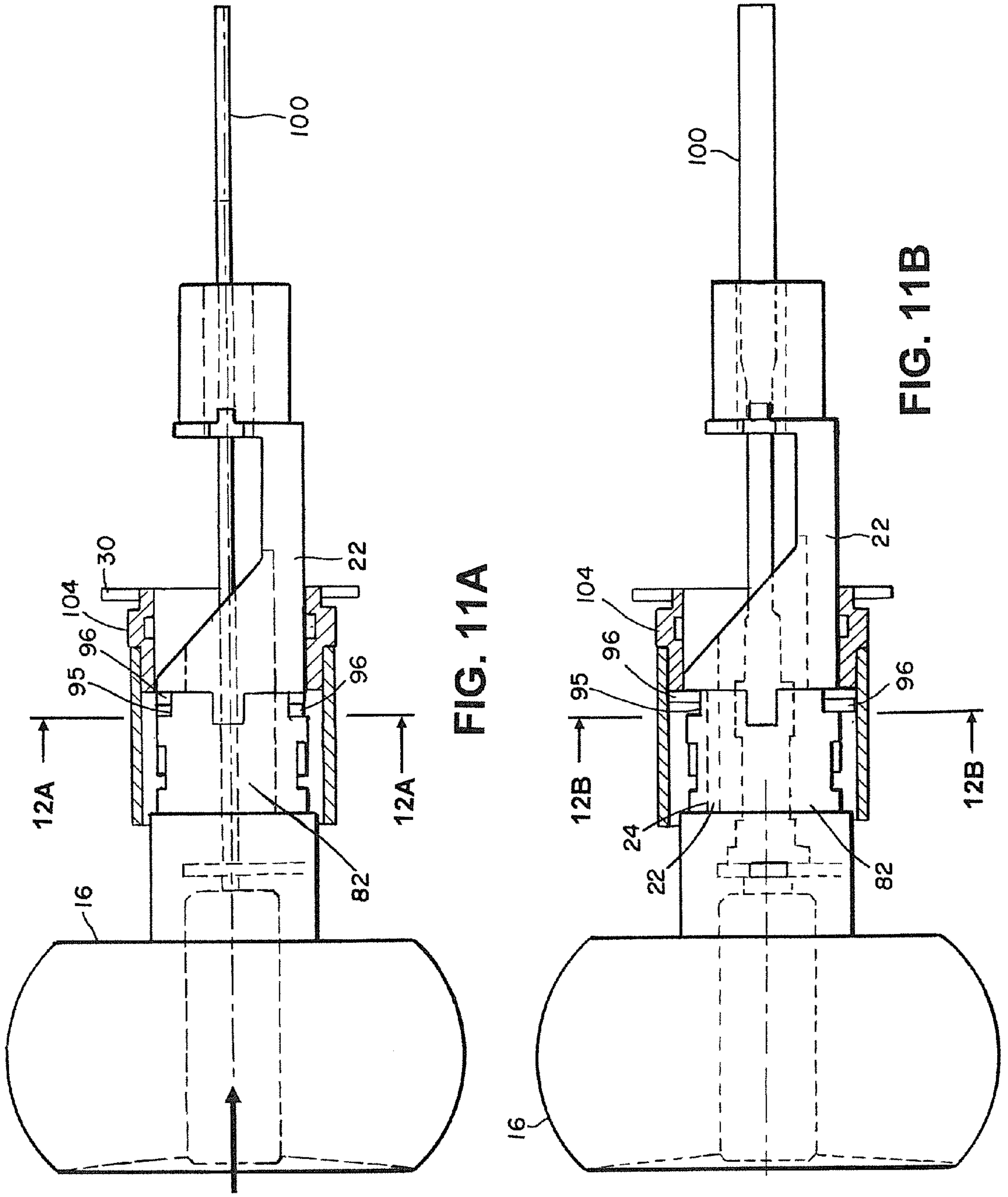
FIG. 11A shows a simplified elevational view, partially in cross-section, of the outside knob and cam spindle assembly in a first, or unlocked, configuration.
FIG. 11B shows the outside knob and cam spindle assembly of FIG. 11A in a second, or locked, configuration.
Figure 12B:
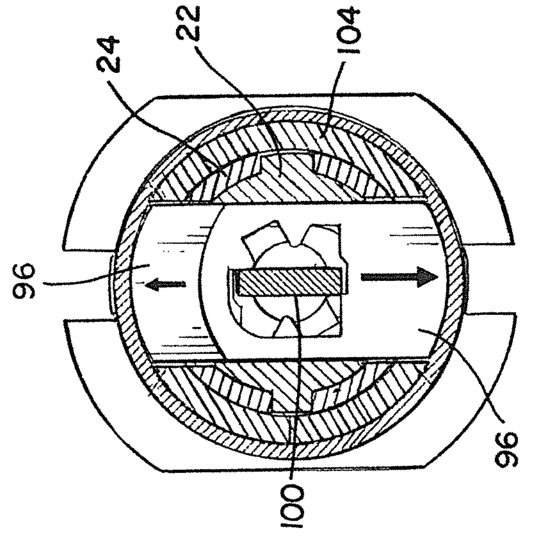
FIG. 12B shows a transverse cross-sectional view along line 12B-12B of FIG. 11B.
Figure 12A:
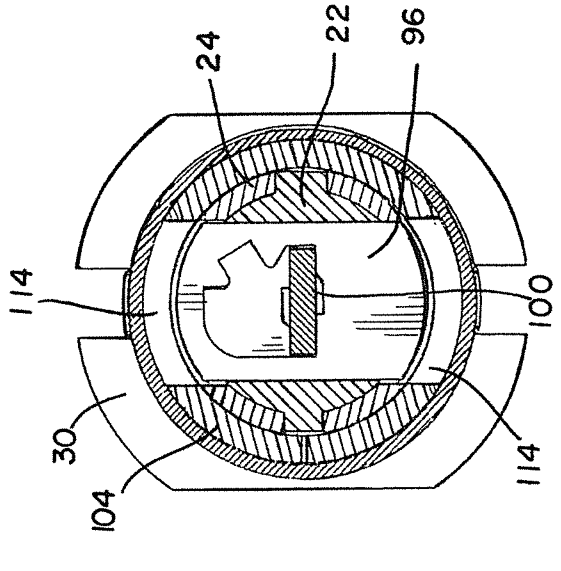
FIG. 12A shows a transverse cross-sectional view along line 12A-12A of FIG. 11A.

FIGS. 11A and 12A show the outside knob 16 connected to the cam element 22 positioned within the first tubular hub 30 and the locking sleeve 104. The locking bar 100 is in a first or unlocked rotational position, which, by its engagement with the locking plates 96, places the locking plates 96 in their first or retracted (withdrawn) position within the channel 95 of the first fitting 82 of the cam element 22. This first, or unlocked, rotational position of the locking bar 100 places the lockset in an unlocked condition, in which the outside knob 16 and the inside knob 14, connected by the cam element 22, the outside spindle 24, and the inside spindle 54 (i.e., the actuator unit), are free to be translated axially through the retractor housing assembly 50, of which first tubular hub 30 and the locking sleeve 104 are a part. In this unlocked condition, the actuator unit can rotate and translate freely in the latch bolt retractor housing assembly 50, thereby enabling the rotational and axial operation of the lockset.

FIGS. 11B and 12B show the cam element 22 after either the keyed cylinder 102 (FIG. 6) of the outside door knob 16 or the turnpiece 59 (FIGS. 9 and 10) on the inside door knob 14 has been operated so as to rotate the locking bar 100 from its first or unlocked rotational position to a second or locked rotational position. As depicted in FIGS. 12A and 12B, when the locking bar 100 rotates, it engages surfaces of the locking plate engagement apertures 98, imparting a camming effect that causes the locking plates 96 to move radially outward though the channel 95 and into the cut-outs 114 from their first or retracted position to their second or extended position. In their second or extended position, the locking plates 96 enter the cut-outs 114 of the locking sleeve 104, so that the locking plates 96 engage the side walls and the recessed arcuate face of the locking cut-outs 114 when they are in their extended position. In the illustrated embodiment, the locking plates are arranged immediately adjacent one another, and the engagement apertures 98 of the locking plates 96 are configured so that rotation of the locking bar 100 from the first to the second position urges a first one of the locking plates in a first radial direction and a second one of the locking plates in a diametrically-opposing second radial direction, so that the locking plates 96 engage respective first and second cut-outs 114 that are also diametrically opposed.

Each of the locking sleeve cut-outs 114 is located and sized to receive and accommodate one of the locking plates 96 when the locking plates 96 are extended through the channel 95 into their respective locking sleeve cut-outs 114, with each of the locking plates 96 engaging the side walls of its respective cut-out 114. Each of the locking plates 96 is thus confined within its corresponding cut-out 114 by the side walls and the recessed axial arcuate surface of the cut-out 114. More specifically, the engagement of the locking plates 96 with the recessed arcuate face of the locking sleeve cut-outs 114 prevents translational motion of the lockset in the axial direction, while the engagement of the locking plates 96 with the side walls of the cut-outs 114 prevents rotational motion, all relative to the latch bolt retractor housing 116.

Thus, either of the locking plates 96 locks the lockset both axially and rotationally, because the locking plates 96 and all connecting structures (the actuator unit) are prevented from movement relative to the latch bolt retractor housing 116 by the confinement of the locking plates 96 within the locking sleeve cut-outs 114. The lockset is thereby locked against both rotational and axial movement of the actuator unit relative to the latch bolt retractor housing assembly 50.

In other embodiments, rather than employing locking plates 96 having the specific structure discussed above, locking members having other shapes, such as cylindrical or semicircular in cross-section, can be configured to be forced radially outwardly upon actuation of the locking bar 100, and complementarily shaped cutouts 114 can receive such locking members so as to provide a rotational and axial locking effect, as discussed above.

The embodiments discussed above have disclosed structures with substantial specificity. This has provided a good context for disclosing and discussing inventive subject matter. However, it is to be understood that other embodiments may employ different specific structural shapes and interactions. For example, in some embodiments the latch bolt retractor housing assembly 50 may comprise more or fewer parts assembled similarly or differently than as discussed, and a cam element 22 and inside spindle 54 may attach to one another or their respective knobs 16, 14 with structure employing more, less, or differently-shaped parts that may connect with one another in different ways than as specifically shown and discussed in the illustrated embodiments. However, preferably the door knobs are part of an actuator unit that includes a cam mechanism so that rotation or axial translation of the door knobs actuates a latch bolt retractor assembly as discussed. A mounting unit of the lockset preferably is configured to be rigidly attached to the associated door, and the actuator unit and latch retractor assembly are supported by the mounting unit. A locking mechanism selectively acts between the mounting unit and the actuator unit to prevent both rotation and axial translation of the door knobs (actuator unit) relative to the mounting unit, and in turn the latch bolt retractor assembly, so as to prevent actuation of the latch bolt retractor assembly.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above, but should be determined only by a fair reading of the claims that follow.

What is claimed is:

1. A lockable lockset, comprising:

an actuator unit comprising an inside knob, an outside knob, and a cam mechanism operatively coupled to the inside knob and the outside knob, the actuator unit configured to move as a unit;

a latch retractor mechanism having a latch bolt that is movable between an extended position and a retracted position;

a mounting unit configured to attach to a door, the mounting unit supporting the actuator unit and the latch retractor mechanism so that the actuator unit and the latch bolt of the latch retractor mechanism can move relative to the mounting unit and each other, the actuator unit being movable rotationally about an axis of the actuator unit and axially along the axis of the actuator unit;

the actuator unit having a first cam configured to engage the latch retractor mechanism during rotational movement of the actuator unit so as to move the latch bolt from the extended position to the retracted position;

the actuator unit having a second cam configured to engage the latch retractor mechanism during axial movement of the actuator unit so as to move the latch bolt from the extended position to the retracted position; and a locking mechanism configured to selectively extend between the actuator unit and the mounting unit so that when the locking mechanism is extended, the actuator unit is prevented from moving both rotationally and axially relative to the mounting unit;

wherein the locking mechanism comprises a first locking member and a second locking member, the first and second locking members being carried by the actuator unit, the first locking member configured to move in a first radial direction from a retracted position to a first radially extended position, the second locking member configured to move in a second radial direction from a retracted position to a second radially extended position different from the first radial direction; and wherein each of the first and second locking members comprises an aperture having a camming surface, and wherein the actuator unit comprises a locking bar extending through the apertures and operatively coupled to a lock actuator in one of the inside and outside knobs, configured so that when the lock actuator is actuated, the locking bar engages the camming surfaces so as to urge the first and second locking members into their respective first and second radially extended positions.

2. A lockable lockset as in claim 1, wherein the lockset is configured so that the actuator unit is biased toward a neutral position in which the first and second cams are not engaged with the latch retractor mechanism and the latch bolt is in the extended position.

3. A lockable lockset as in claim 1, wherein the locking bar extends generally along the axis of the actuator unit.

4. A lockable lockset as in claim 3, wherein the locking bar is configured to rotate about the axis when actuated.

5. A lockable lockset as in claim 1, wherein each of the first and second locking members comprises a plate having opposing face surfaces and opposing edge surfaces, a width being defined between the edge surfaces and a thickness being defined between the face surfaces.

6. A lockable lockset as in claim 5, wherein the first and second locking members are disposed adjacent one another and generally parallel to one another.

7. A lockable lockset as in claim 6, wherein the actuator unit includes a diametric channel through the actuator unit, and wherein the first and second locking members are movable in diametrically opposite directions through the channel between a withdrawn unlocked position and an extended locked position.

8. A lockable lockset as in claim 6, wherein the actuator unit is configured so that when it is in a neutral position in which the first and second cams are not engaged with the latch retractor mechanism and the latch bolt is in the extended position, it is movable axially only in a first axial direction.

9. A lockable lockset as in claim 8, wherein the mounting unit comprises a first cutout and a second cutout that are aligned with the first and second locking members, respectively, when the actuator unit is in the neutral position, wherein each cutout has opposing edge faces having a cutout width defined therebetween, wherein a cutout axial stop surface extends between the edge faces, wherein the cutout is configured to receive an associated aligned locking member when the associated aligned locking member is in the radially extended position so that the associated aligned locking member edge surfaces will engage the cutout opposing edge faces to prevent rotational movement of the actuator unit, and wherein the associated aligned locking member face surface can engage the associated cutout axial stop surface to prevent axial movement of the actuator unit in the first axial direction.

10. A lockable lockset as in claim 9, wherein the mounting unit comprises a first tubular hub configured to support the actuator unit, and a locking sleeve is disposed within the first hub, the cutouts being formed by the locking sleeve.

11. A lockable lockset, comprising:

an actuator unit comprising an inside knob, an outside knob, and a cam mechanism operatively coupled to the inside knob and the outside knob, the actuator unit configured to move as a unit;

a latch retractor mechanism having a latch bolt that is movable between an extended position and a retracted position;

a mounting unit configured to attach to a door, the mounting unit supporting the actuator unit and the latch retractor mechanism so that the actuator unit and the latch bolt of the latch retractor mechanism can move relative to the mounting unit and each other, the actuator unit being movable rotationally about an axis of the actuator unit and axially along the axis of the actuator unit;

the actuator unit having a first cam configured to engage the latch retractor mechanism during rotational movement of the actuator unit so as to move the latch bolt from the extended position to the retracted position;

the actuator unit having a second cam configured to engage the latch retractor mechanism during axial movement of the actuator unit so as to move the latch bolt from the extended position to the retracted position; and a locking mechanism configured to selectively extend between the actuator unit and the mounting unit so that when the locking mechanism is extended, the actuator unit is prevented from moving both rotationally and axially relative to the mounting unit;

wherein the locking mechanism comprises a first locking member and a second locking member, the first and second locking members being carried by the actuator unit, the first locking member configured to move in a first radial direction from a retracted position to a first radially extended position, the second locking member configured to move in a second radial direction from a retracted position to a second radially extended position different from the first radial direction;

wherein each of the first and second locking members comprises a plate having opposing face surfaces and opposing edge surfaces, a width being defined between the edge surfaces and a thickness being defined between the face surfaces; and wherein the mounting unit comprises a first cutout and a second cutout that are aligned with the first and second locking members, respectively, when the actuator unit is in a neutral position in which the first and second cams are not engaged with the latch retractor mechanism and the latch bolt is in the extended position, wherein each cutout has opposing edge faces having a cutout width defined therebetween, wherein a cutout axial stop surface extends between the edge faces, wherein the cutout is configured to receive an associated aligned locking member when the associated aligned locking member is in the radially extended position so that the associated aligned locking member edge surfaces will engage the cutout opposing edge faces to prevent rotational movement of the actuator unit, and wherein the associated aligned locking member face surface can engage the associated cutout axial stop surface to prevent axial movement of the actuator unit.

12. A lockable lockset as in claim 11, wherein each of the first and second locking members comprises an aperture having a camming surface, and wherein the actuator unit comprises a locking bar extending through the apertures and operatively coupled to a lock actuator in one of the inside and outside knobs, configured so that when the lock actuator is actuated, the locking bar engages the camming surfaces so as to urge the first and second locking members into their respective first and second radially extended positions.

13. A lockable lockset as in claim 11, wherein the actuator unit is configured so that when it is in the neutral position, it is movable axially only in a first axial direction.

14. A lockable lockset as in claim 11, wherein the mounting unit comprises a first tubular hub configured to support the actuator unit, and a locking sleeve is disposed within the first hub, the cutouts being formed by the locking sleeve.

15. A lockable lockset as in claim 14, wherein the locking sleeve and the locking mechanism are disposed on a side of the latch retractor mechanism closer to the outside knob than to the inside knob, and the first axial direction in which the actuator unit is movable from the neutral position is directed from the outside knob toward the latch retractor mechanism.

16. A lockable lockset as in claim 15, wherein the inside knob is operatively coupled with a tubular inside knob spindle having an end that is joined to an end of the cam mechanism, wherein a diametric channel is provided between the joined ends of the inside knob spindle and the cam mechanism, and wherein the first and second locking members are disposed adjacent one another and generally parallel to one another and are movable in diametrically opposite directions in the channel between a withdrawn unlocked position and an extended locked position.

17. A lockable lockset as in claim 11, wherein the first and second locking members are disposed adjacent one another and generally parallel to one another, and wherein the axial stop surface of the first cutout is longitudinally spaced from the axial stop surface of the second cutout along a longitudinal axis of the mounting unit.

18. A lockable lockset as in claim 11, wherein the first and second locking members are disposed adjacent one another and generally parallel to one another, and wherein the axial stop surface of the first cutout and the axial stop surface of the second cutout are radially spaced from one another but not longitudinally spaced from one another along a longitudinal axis of the mounting unit.

* * * * *